United States Patent Office 3,011,871
Patented Dec. 5, 1961

3,011,871
PROCESS FOR TREATING AMMONIUM BORATES
Frank H. May and Vladimir V. Levasheff, Whittier, Calif., assignors to American Potash & Chemical Corporation, a corporation of Delaware
No Drawing. Filed May 11, 1959, Ser. No. 812,129
17 Claims. (Cl. 23—149)

It has heretofore been proposed to recover the borate values from calcium borate ores as an ammonium borate. This invention relates, in turn, to the conversion of ammonium borate to boric acid and ammonia by a cyclic process in which a lower alkyl alcohol having from two to six carbon atoms is employed to react with the ammonium borate to form ammonia, water, and the trialkyl borate ester. The water is taken up with an azeotrope former to form an azeotrope which is readily separated from the ester. Thereafter, the ester can be hydrolyzed by the addition of the required amount of water to provide a slurry of boric acid in alcohol from which the boric acid is readily recovered. Thus, the invention can be considered as a method for producing trialkyl borate esters from an ammonium borate, as well as a method for producing boric acid from an ammonium borate, without the use of an acid such as sulfuric acid.

The economics of the method for producing borate esters, in terms of steam consumption, are at least equivalent to the method of preparation of these materials using boric acid. The efficiency of the reaction is further demonstrated by the fact that it is possible to carry the reaction considerably beyond the formation of borate ester and produce boric oxide or boroxine solutions in the ester, which are completely free of residual ammonia.

The effectiveness of ammonia removal will be appreciated when it is pointed out that the equivalent removal of ammonia and water from ammonium borate can only be accomplished at above fusion temperatures of 800° C. Even under these conditions, the final boric oxide fused product contains as much as 0.5% ammonia.

The stoichiometry of the basic reaction can be represented as follows, depending upon the ammonium borate starting material:

(1) 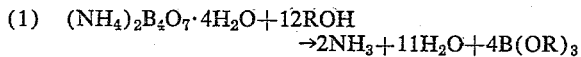

or (2) 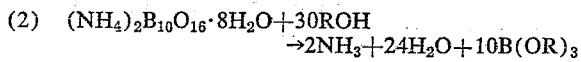

Subsequently, the trialkyl borate ester can be hydrolyzed with water to produce a slurry of the boric acid and alcohol:

(3) 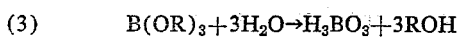

As an alcohol, one can employ any of the lower aliphatic alcohols such as ethanol, propanol, isopropanol, butanol, hexanol, and the various amyl alcohols; methanol is not useful since it forms an azeotrope with trimethyl borate. Instead of an alcohol to form the azeotrope with water, one can employ any known azeotrope former which is inert to the other reactants, such as cyclohexene, propyl ether, diisobutylene, 1,3-cyclohexadiene, 1-bromopropane, iodomethane, benzene and isopropyl ether. In the case of butyl and higher alcohols, an excess of alcohol can be used as a water removing agent because these alcohols form low boiling azeotrope with water which separate on cooling to room temperature, forming two phases. This permits easy separation and recovery of the alcohol fraction. By recycle methods, it is therefore possible to carry out the process with a minimum of excess alcohol.

The useful alkyl alcohols below butyl, however, are completely miscible with water at room temperatures. There is no ready method of separation of the water-alcohol azeotrope distillate and consequently the recovery and recycle of alcohol may be quite complicated. This disadvantage may largely be overcome by adding another azeotropic agent to the reaction mixture which effectively removes water from the reaction mixture as a ternary azeotrope and in the same manner as the higher alcohols, separates into two phases at room temperature.

The invention will become further apparent from the following, wherein various procedures, illustrating the practice of the invention, are set forth.

*Example I.*—100 grams of ammonium pentaborate octahydrate were slurried with 516 grams of n-butanol in a 1-liter distillation flask. These reaction quantities corresponded to the stoichiometry, as shown in Equation 2 above, except that 107.6 grams excess of n-butanol was used to distill water in an n-butanol-water azeotrope (42.5% $H_2O$ at boiling point of 92.0° C.).

The 1-liter distillation flask was connected to a 1-foot (1-inch diameter) column, filled with 0.125 inch Berl saddles. This column was topped by a Dean-Stark azeotrope trap, which was serviced by an 80–83° C. circulating water condenser, for vapor condensation, and a tap water cooled azeotrope trap condenser. The vent from the vapor condenser was connected to the ammonia absorption system.

The evolved ammonia was absorbed in 1.028 N HCl and in this manner the $NH_3$ evolution rate was determined instantaneously. The over-all or average rate of $H_2O$ evolution was determined from the total weights of the top and bottom layers of n-butanol-$H_2O$ distillate collected in the azeotrope trap; at 20° C. the water phase contains 92.2% water and the alcohol phase 20.1% water. It was found that 6.49 grams of water were distilled per gram of ammonia in this run. Additional data pertaining to this run are given in Table I. From the material balance, it is evident that an essentially theoretical yield of tri-n-butyl borate was obtained (424 grams found in pot material vs. 422.8 grams theoretical). The amount of water removed, 79.0 grams, was also close to theory, 79.4 grams. The total ammonia evolved, based on an analysis of pot material, was found to be 97% of theoretical.

TABLE I

*Preparation of tri-n-butyl borate from ammonium pentaborate octahydrate and n-butanol*

Starting mixture (g):
 $(NH_4)_2B_{10}O_{16} \cdot 8H_2O$ 100, n-$C_4H_9OH$ 516
Distillation data:
 Head temperature (° C.), 88–102; total reflux time 145 min.
 Pot temperature (° C.), 100–137
 Pressure, atm.
Distillation azeotrope trap:
 Top layer (wt., g.), 10.0
 Bottom layer (wt., g.), 83.5
Total $H_2O$ removed: 79.0 g.
Liquid pot material: 515.0 g.
Analysis, wt. percent butyl borate: 82.3

*Example II.*—To illustrate the production of boric acid by a controlled hydrolysis of tri-n-butyl borate, 506.4 grams of pot material from Example I, containing 416.8 grams of borate ester, was hydrolyzed with 97 grams of water, as shown in Equation 3. This operation was carried out in a 1-liter three-neck flask fitted with a thermometer, a motor-driven agitator and an addition funnel. The reaction was started at room temperature (25.5° C.) and 97 grams of water added incrementally within a period of one hour. The final slurry temperature was 45.5° C. at the end of the water addition. The slurry was cooled under agitation to room temperature and the resulting boric acid solids separated by filtration on a Büchner funnel, displace washed with petroleum ether and air dried. The dry product (84.5 grams) was found by analysis to be 99.5% $H_3BO_3$. A quantity of filtrate (422 grams), containing 5.2% $H_3BO_3$, 94.8% n-butanol, was set aside for use in the next example.

*Example III.*—A quantity (256.5 grams) of boric acid filtrate from Example II was next used for a recycle preparation of tri-n-butyl borate from 41.7 grams of ammonium pentaborate octahydrate.

This preparation was carried out in the equipment used in Example I. The quantities of starting materials in the recycle filtrate were 13.3 grams of boric acid and 243.2 grams of the alcohol; the 13.3 grams of boric acid is that soluble in the alcohol at room temperature (25° C.). Of the alcohol, 47.8 grams reacted with the acid to form the ester, in accordance with the reverse of Reaction 3. The remaining 195.4 grams excess of the alcohol was reacted with 41.7 grams of ammonium pentaborate octahydrate in accordance with Reaction 2.

The data obtained in this recycle preparation are summarized in Table II.

TABLE II

*Recycle preparation of tri-n-butyl borate from ammonium pentaborate octahydrate and n-butanol-boric acid filtrate*

Starting materials (g.):
  $(NH_4)_2B_{10}O_{16} \cdot 8H_2O$ 41.7; recycle filtrate 256.5
Distillation data:
  Head temperature (° C.), 90–97; total reflux time, 80 min.
  Pot temperature (° C.), 97–183
  Pressure, atm.
Distillation azeotrope trap:
  Top layer (wt., g.), 16.5
  Bottom layer (wt., g.), 43.2
Total $H_2O$ removed: 43.1 g.
Liquid pot material: [1] 227 g.
Analysis, wt. percent butyl borate: 100.3

[1] In this test pot material was found to contain 0.76 g. of solid unreacted $(NH_4)_2B_{10}O_{16}$ (anhydrous).

Material balance data shows that the total ammonia evolved, based on analysis of pot material, was 97.7% of theoretical. The amount of water collected in the azeotrope trap (43.1 grams) was also close to the theoretical (44.7 grams) value.

The tri-n-butyl borate product obtained after filtering off a small amount of unreacted ammonium borate was of acceptable purity. The fact that some unreacted ammonium borate was found present in the pot residues indicates that an insufficient amount of n-butanol was present initially in the reaction mixture.

*Example IV.*—To demonstrate the latitude of this method of preparation of alkyl borate esters and of boric acid from ammonium borates, the preparation of tri-n-hexyl borate was carried out using n-hexanol and ammonium pentaborate octahydrate, as required by Equation 2. This reaction was run in the equipment used in Example I. 50 grams of the ammonium borate were reacted with 281.5 grams of the alcohol. In addition to the above quantities, an excess of n-hexanol was used to remove water as the n-hexanol-water azeotrope (B.P. 97.8° C., weight percent $H_2O$ 75.0). The azeotrope trap was filled with 51.5 grams of n-hexanol, while the reaction flask contained 50 grams of $(NH_4)_2B_{10}O_{16} \cdot 8H_2O$ and 281.5 grams of n-hexanol. The data pertaining to this test are given in Table III.

TABLE III

*Preparation of tri-n-hexyl borate from ammonium pentaborate octahydrate and n-hexanol*

Starting materials (g.):
  $(NH_4)_2B_{10}O_{16} \cdot 8H_2O$ 50, $CH_3(CH_2)_4CH_2OH$ 281.5
Distillation data:
  Head temperature (° C.), 89–94; total reflux time, 50 min.
  Pot temperature (° C.), 115–179
  Pressure, atm.
Distillation azeotrope trap:
  Top layer (wt., g.), 23.7
  Bottom layer [1] (wt., g.), 38.0
Total $H_2O$ removed: 37.8 g.
Liquid pot material: [2] 316 g.
Analysis, wt. percent tri-n-hexyl borate: 93.0

[1] 99.4% $H_2O$, Seidell, vol. II, p. 460.
[2] Pot material was found to contain 0.8 gram of unreacted ammonium borate as solids.

The yield (based on ammonium borate) of tri-n-hexyl borate was calculated from the material balance to be 99.2%. The amount of water evolved (37.8 grams) was found to be close to theoretical (39.7 grams). Analysis of pot material also showed that essentially the theoretical amount of ammonium was evolved.

*Example V.*—A quantity of tri-n-amyl borate was prepared using 242.9 grams of n-amyl alcohol and 50 grams of ammonium pentaborate octahydrate, using the stoichiometry of Equation 2. An excess of n-amyl alcohol (51.5 grams) was added in the azeotrope trap to remove water as the n-amyl alcohol-water azeotrope (B.P. 95.8° C., weight percent $H_2O$ 54.4). The run was carried out in the equipment previously described for Example I. The data obtained are given in Table IV.

TABLE IV

*Preparation of tri-n-amyl borate from n-amyl alcohol and ammonium pentaborate octahydrate*

Starting materials (g.):
  $(NH_4)_2B_{10}O_{16} \cdot 8H_2O$ 50, $CH_3(CH_2)_3CH_2OH$ 243
Distillation data:
  Head temperature (° C.), 92–128; total reflux time, 85 min.
  Pot temperature (° C.), 100–225
  Pressure, atm.
Distillation azeotrope trap:
  Top layer [1] (wt., g.), 19.0
  Bottom layer [2] (wt., g.), 39.6
Total $H_2O$ removed: 40.5 g.
Liquid pot material: 272.5 g.
Analysis, wt. percent tri-n-amyl borate: 91.6

[1] 97.4% $H_2O$.
[2] 10% $H_2O$, Seidell, vol. II, p. 313.

The theoretical amount of the tri-n-amyl borate ester (249.6 grams) was obtained although the water evolved (40.5 grams) was higher than theoretical (39.7 grams), indicating moisture in the starting materials. No ammonia was found in the pot material, indicating complete removal of this component.

*Example VI.*—A run was carried out using ammonium pentaborate octahydrate and n-butanol starting materials, in which the amount of ammonium borate used was in 100% excess of butanol, as shown in the following equations:

(4)   $(NH_4)_2B_{10}O_{16} \cdot 8H_2O + 30C_4H_9OH \rightarrow$
            $10B(OC_4H_9)_3 + 2NH_3 + 24H_2O$ (5)   $(NH_4)_2B_{10}O_{16} \cdot 8H_2O \rightarrow 2NH_3 + 5B_2O_3 + 9H_2O$ In one run, 99.4 grams of $(NH_4)_2B_{10}O_{16} \cdot 8H_2O$ were slurried with 203 grams of n-butanol. This test run was made in the previously described equipment of Example I. The azeotrope trap was filled with 60 cc. $H_2O$ at the start of the test and then during the distillation quantities of $H_2O$ layer (92.2% $H_2O$) were drained from the trap. The net water evolved during the test (53.8 grams) corresponded closely to the theoretical amount (54.3 grams) while the amount of $NH_3$ evolved, based on pot material analysis, was 93.4%. At the end of the run, the pot residue material (229.5 grams) was found to contain a small amount (5.5 grams) of solids, which by analysis was found to be ammonium borate (7.38% $NH_3$, 77.12% $B_2O_3$). The clear pot residue filtrate was found to contain 7.6% B and no $NH_3$. The calculated composition of the pot residue filtrate was 11% $B_2O_3$ and 89% $B(OC_4H_9)_3$. The data pertaining to this preparation are given in Table V.

TABLE V

*Preparation of tri-n-butyl borate-boric oxide solution from ammonium pentaborate octahydrate and n-butanol*

Starting materials (g.):
 $(NH_4)_2B_{10}O_{16} \cdot 8H_2O$ 99.4, n-butanol 203
Distillation data:
 Head temperature (° C.), 89-95
 Pot temperature (° C.), 102—241
 Pressure, atm.
 Total reflux time, 4½ hours
Total $H_2O$ removed: 53.8 g.
Liquid pot material: 229.5 g.
Pot filtrate: Analysis, wt. percent, B 7.6
Calculated composition of filtrate: Analysis, wt. percent—

| $B_2O_3$ | $(C_4H_9O)_3B$ |
|---|---|
| 11.0 | 89.0 | or

| $(C_4H_9O)_3B \cdot B_2O_3$ | $(C_4H_9O)_3B$ |
|---|---|
| 47.3 | 52.7 |

*Example VII.*—Fifty grams of ammonium pentaborate octahydrate were slurried with 224 grams of n-propyl alcohol and 100 grams of diisobutylene (Shell Chemical Corporation diisobutylene is approximately a 4:1 mixture of 2,4,4-trimethylpentene-1 and 2,4,4-trimethylpentene-2, B.P. 100–103° C.) in a 500 ml., three-neck flask fitted with a packing gland equipped motor driven agitator, a thermometer and a 3-foot (1" diameter) fractionating column filled with 0.16 x 0.16 inch Penn State protruded steel packing. The column was topped with a modified Dean-Stark azeotrope trap which was serviced by the 60–65° C. water condenser for vapor condensation, and a tap water cooled azeotrope trap condenser. The vent from the vapor condenser was connected to the previously described ammonia absorption system.

An approximately 35% excess of n-propanol over the stoichiometry, as shown in the equation (6) $(NH_4)_2B_{10}O_{16} \cdot 8H_2O + 30C_3H_7OH \rightarrow$
$2NH_3 + 24H_2O + 10B(OC_3H_7)_3$ was used to allow for a small loss of alcohol through the 60–65° C. vapor condenser as well as for the loss of alcohol in the water layer in the azeotrope trap. Before the start of the distillation, the azeotrope trap was filled with diisobutylene (about 52 g.). The data obtained are summarized in Table VI.

TABLE VI

*Preparation of tri-n-propyl borate using ammonium pentaborate octahydrate and n-propanol starting materials and diisobutylene as azeotropic agent*

Starting materials (g.):
 $(NH_4)_2B_{10}O_{16} \cdot 8H_2O$ 50, n-$C_3H_7OH$ 224, diisobutylene 100
Distillation data:
 Pot temperature (° C.), 75-83; total reflux time, 6 hrs.
 Head temperature (° C.), 82-111
 Pressure, atm.
Distillation azeotrope trap:

| | Wt., g. | Analysis, Wt. percent | | | |
|---|---|---|---|---|---|
| | | $NH_3$ | $H_2O$ | n-$C_3H_7OH$ | Diisobutylene |
| Top Layer | 36.8 | 0.12 | 2.76 | 36.4 | 60.7 |
| Bottom Layer | 50.3 | 1.25 | 74.10 | 24.6 | nil |

Liquid pot material: 262.4 g.
Analysis, wt. percent:

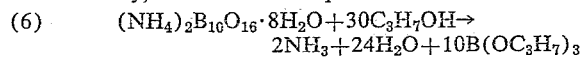

| $NH_3$ | B | $(C_3H_7O)_3B$ |
|---|---|---|
| Trace | 3.83 | 66.6 |

$NH_3$ scrubber contained 2.37 g. $NH_3$ by analysis of the 1.106 N HCl scrubber liquor.

At the end of the run, the pot material was found by analysis to contain 3.83% boron and only a trace of ammonia. Material balance data indicate essentially theoretical removal of $NH_3$ (3.04 g.) from the reaction flask with correspondingly theoretical conversion of ammonium borate to the tri-n-propyl borate ester. The amount of water collected (38.3 g.) also was found to be close to the theoretical value.

The use of methyl alcohol in the production of borate esters and of boric acid from ammonium borate starting material is more difficult due to the following considerations. Removal of water of reaction and hydration from the system ammonium borate-methanol is complicated by the fact that the trimethyl borate-methanol azeotrope (B.P. 54.6° C.) distills together with the ammonia and recombines with it in the condensing system of the apparatus. For this reason, the use of methanol and methyl borate is impractical.

It was found similarly difficult to prepare triethyl borate from ethanol and ammonium borate starting materials as the boiling points of ethanol (78.3° C.), ethanol-water azeotrope (78.2° C.) and of ethanol-ethyl borate azeotrope (76.5° C.) make it virtually impossible to separate and remove water from the system by distillation methods. However, with selection of an appropriate azeotropic agent, such as cyclohexene, it was found possible to obtain a small, but definite, conversion of ammonium borate to triethyl borate, as shown in the following example.

*Example VIII.*—Preparation of triethyl borate using ammonium pentaborate octahydrate and absolute ethanol raw materials was carried out using the previously described apparatus and procedure. In this test, cyclohexene was used as the azeotropic medium. The reaction quantities were in accordance with the stoichiometry of the following equation:

(7) $(NH_4)_2B_{10}O_{16} \cdot 8H_2O + 30C_2H_5OH \rightarrow$
$10B(OC_2H_5)_3 + 2NH_3 + 24H_2O$ The data obtained are summarized in Table VII.

TABLE VII

*Preparation of triethyl borate from ammonium pentaborate octahydrate and ethanol, using cyclohexene as azeotropic medium*

Starting materials (g.):
 $(NH_4)_2B_{10}O_{16} \cdot 8H_2O$ 52, $C_2H_5OH$ * 133, cyclohexene 106
Distillation data:
 Head temperature (° C.), 64-67; total reflux time 2½ hrs.
 Pot temperature (° C.), 72-80
 Pressure, atm.
 Vapor condenser (° C.), 50-55
Distillation azeotrope trap:

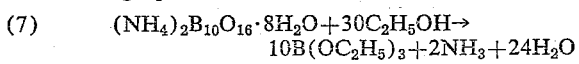

| | Wt., g. | Analysis, Wt. percent | | | |
|---|---|---|---|---|---|
| | | $NH_3$ | $H_2O$ | $C_2H_5OH$ | Cyclohexene |
| Top Layer | 18 | .04 | 1.09 | 17.80 | 81.07 |
| Bottom Layer | 67 | .02 | 8.88 | 56.50 | 34.60 |

Pot material:

| | Wt., g. | Analysis, Wt. percent | |
|---|---|---|---|
| | | $NH_3$ | B |
| Solids | 28.0 | 6.70 | 19.77 |
| Liquor | 159.0 | 0.13 | 3.00 |

$NH_3$ scrubber contained 1.08 g. $NH_3$ by analysis of the 1.106 N HCl scrubber liquor.

* Net $C_2H_5OH$, 133 + 45 − 54.3 = 123.7.

Evaluation of the above data indicates that 33% of theoretical ammonia was collected in the hydrochloric acid scrubber while an additional 3% was found in the azeotrope trap materials. The solids (28 g.) removed from the reaction pot were, by chemical analysis, 99.4% ammonium pentaborate octahydrate starting material. The ammonia present in the liquor of the reaction slurry was calculated to the ammonium pentaborate octahydrate. The solids recovered plus the calculated solubility of the ammonium pentaborate octahydrate represent 60% of the original charge. The amount of water recovered in the azeotrope trap was equivalent to 15% of theoretical and is representative of the extent of the ester formation. The higher ammonia value is partially due to thermal decomposition of ammonium borate.

*Example IX.*—Preparation of triisopropyl borate was carried out using amonium pentaborate octahydrate and isopropanol as starting materials and benzene as an azeotroping agent. The previously described equipment and procedure were used in this run. The data obtained are summarized in Table VIII.

TABLE VIII

*Preparation of triisopropyl borate using ammonium pentaborate octahydrate and isopropanol starting materials and benzene as azeotropic agent*

Starting mixture (g.):
  $(NH_4)_2B_{10}O_{16} \cdot 8H_2O$ 50, isopropanol 174, benzene 100
Distillation data:
  Head temperature (° C.), 64–68; total reflux time, 8 hrs.
  Pot temperature (° C.), 73–81
  Pressure, atm.
Distillation azeotrope trap:

| | Wt., g. | Analysis, Wt. percent | | | |
|---|---|---|---|---|---|
| | | $NH_3$ | $H_2O$ | $C_3H_7OH$ | $C_6H_6$ |
| Top Layer | 32.0 | 0.06 | 3.77 | 28.7 | 67.47 |
| Bottom Layer | 40.5 | 0.20 | 44.50 | 55.3 | nil |

Pot material:

| | Wt., g. | Analysis, Wt. percent | |
|---|---|---|---|
| | | $NH_3$ | B |
| Solids | 8.0 | 7.60 | 19.9 |
| Liquor | 288.0 | 0.02 | 2.9 |

$NH_3$ scrubber contained 1.9 g. $NH_3$ by analysis of the 1.106 N HCl scrubber liquor.

Evaluation of material balance data indicates that 48.5% of the theoretical water was removed as distillate, and 64% of theoretical ammonia was recovered in the scrubber and in the distillate. The ammonia content of pot material liquor was assumed to be from solubility of ammonium borate. The total boron value of liquor was corrected for the amount of soluble ammonium pentaborate octahydrate and the balance was calculated to triisopropyl borate. On this basis, conversion of ammonium borate to isopropyl borate was found to be 82.5%. The residual solids were found by analysis to be essentially ammonium pentaborate octahydrate. These solids and calculated amount of ammonium pentaborate octahydrate present in pot material liquor represent 17.9% of the original charge.

In all of the runs described here, ammonium pentaborate octahydrate was used as raw material. This was done because this is a more stable compound and quantities of it are readily available. Ammonium tetraborate tetrahydrate has a relatively high vapor pressure of ammonia and must be kept in sealed containers to maintain its composition. However, in the recovery of borate values from colemanite ores, the ammonium borate produced is the tetraborate. The use of ammonium tetraborate is in all ways similar to the use of pentaborate except that additional ammonia comes off more readily at the initial stages of the distillation reaction.

We claim:

1. A process for the preparation of a borate ester of the formula $(RO)_3B$ where R is an alkyl group of two to six carbon atoms consisting of: forming a mixture of an ammonium borate and an alcohol of the formula ROH, where R is as designated above, adding thereto sufficient of an azeotrope former selected from the class consisting of cyclohexene, propyl ether, diisobutylene, 1,3-cyclohexadiene, 1-bromopropane, iodomethane, benzene, isopropyl ether and an alcohol of the formula R'OH where R' is an alkyl group of four to six carbon atoms to cause substantially all of the water formed by the said reaction of ROH and ammonium borate to form an azeotrope, applying heat thereto to initiate a reaction between the said ammonium borate and said ROH and distilling the reaction mixture so formed to drive off gaseous $NH_3$ and an azeotrope containing water and said azeotrope former, said ROH being added in sufficient quantity to react with substantially all of said ammonium borate whereby to form ammonia, $H_2O$ and said $(RO)_3B$.

2. A process for the preparation of a borate ester of the formula $(R'O)_3B$ where R' is an alkyl group of four to six carbon atoms consisting of: forming a mixture of an ammonium borate and an alcohol of the formula R'OH where R' is as designated above, said alcohol being added in excess of the stoichiometric requirements needed to react with substantially all of said ammonium borate whereby to form ammonia, $H_2O$ and said $(R'O)_3B$, a sufficient excess of said R'OH being added to permit substantially all of the water formed by the said reaction to form an azeotrope with said R'OH, applying heat thereto to initiate a reaction between the said ammonium borate and the said R'OH and distilling the reaction mixture so formed to drive off gaseous ammonia and a water-R'OH azeotrope.

3. A process for the preparation of a borate ester of the formula $(R'O)_3B$ where R' is an alkyl group of four to six carbon atoms consisting of: forming a mixture of an ammonium borate and an alcohol of the formula R'OH where R' is as designated above, said R'OH being added in excess of the stoichiometric requirements needed to react with susbtantially all of said ammonium borate whereby to form ammonia, $H_2O$ and said $(R'O)_3B$, a sufficient excess of said R'OH being present to permit substantially all of said $H_2O$ formed to form an $H_2O$-azeotrope, applying heat thereto to initiate a reaction between the said ammonium borate and the said R'OH and distilling the reaction mixture so formed to drive off gaseous ammonia and an $H_2O$—ROH azeotrope, permitting the azeotrope to cool sufficiently to cause the separation of the $H_2O$ and R'OH components thereof and recycling the R'OH so recovered in the said process.

4. The process of claim 2 wherein said R'OH is butanol.

5. The process of claim 2 wherein said R'OH is amyl alcohol.

6. The process of claim 2 wherein said R'OH is hexanol.

7. A process for the preparation of a borate ester of the formula $(R''O)_3B$ where R'' is an alkyl group having between two and three carbon atoms consisting of: forming a mixture of an ammonium borate and an alcohol of the formula R''OH where R'' is as designated above, said R''OH being present in sufficient quantity to react with substantially all of said ammonium borate whereby to form ammonia, $H_2O$ and said $(R''O)_3B$, adding thereto sufficient of an azeotrope former selected from the class consisting of cyclohexene, propyl ether, diisobutylene, 1,3-cyclohexadiene, 1-bromopropane, iodomethane, benzene, isopropyl ether and an alcohol of the formula R'OH where R' is an alkyl group of four to six carbon atoms to permit substantially all of the water formed by the said reaction to form an azeotrope with said azeotrope former, applying heat thereto to initiate a reaction between the said ammonium borate and the said R''OH and distilling the reaction mixture so formed to drive off gaseous ammonia and an azeotrope containing said water.

8. A process for the preparation of a borate ester of the formula (R'O)₃B where R' is an alkyl group having four to six carbon atoms consisting of: forming a mixture of an ammonium borate and an alcohol of the formula R'OH where R' is as designated above, said R'OH being present in sufficient quantity to react with substantially all of said ammonium borate to form ammonia, H₂O and said (R'O)₃B, adding thereto sufficient of an azeotrope former selected from the class consisting of cyclohexene, propyl ether, diisobutylene, 1,3-cyclohexadiene, 1-bromopropane, iodomethane, benzene, isopropyl ether and an alcohol of the formula R'OH where R' is an alkyl group of four to six carbon atoms to permit substantially all of the water formed by the said reaction to form an azeotrope with the said azeotrope former, applying heat thereto to initiate a reaction between the said ammonium borate and the said R'OH and distilling the reaction mixture so formed to drive off gaseous ammonia and an azetotrope containing water, cooling the azeotrope so recovered to cause the separation of the components thereof and recycling the said azeotrope former so recovered in the said process.

9. The process of claim 7 wherein the said R'OH is propanol.

10. The process of claim 7 wherein the said R'OH is ethanol.

11. The process of claim 7 wherein the azeotrope former is diisobutylene.

12. The process of claim 7 wherein the azeotrope former is cyclohexene.

13. The process of claim 7 wherein the azeotrope former is benzene.

14. A process for the preparation of a borate ester of the formula (R'O)₃B where R' is an alkyl group of four to six carbon atoms consisting of: forming a mixture of an ammonium borate and an alcohol of the formula R'OH where R' is as designated above, said R'OH being present in sufficient quantity to react with substantially all of said ammonium borate to form ammonia, H₂O and said (R'O)₃B, a sufficient excess of said R'OH being present to permit substantially all of the H₂O formed by the said reaction to form an azeotrope with the said R'OH, applying heat thereto to initiate a reaction between the said ammonium borate and the said R'OH and distilling the reaction mixture so formed to drive off gaseous ammonia and an H₂O—R'OH azeotrope, hydrolyzing the (R'O)₃B to form boric acid and R'OH and recycling the said R'OH in the said process.

15. The process of claim 14 wherein the azeotrope distilled from the reaction mixture is cooled to room temperature whereby to separate the components thereof and wherein R'OH recovered therefrom is recycled in the said process.

16. A process for the preparation of a borate ester of the formula (R"O)₃B where R" is an alkyl group of between two and three carbon atoms consisting of: forming a mixture of an ammonium borate and an alcohol of the formula R"OH wherein R" is as designated above, said R"OH being present in sufficient quantity to react with substantially all of said ammonium borate to form ammonia, H₂O and said (R"O)₃B, adding thereto sufficient of an azeotrope former selected from the class consisting of cyclohexene, propyl ether, diisobutylene, 1,3-cyclohexadiene, 1-bromopropane, iodomethane, benzene, isopropyl ether and an alcohol of the formula R'OH where R' is an alkyl group of four to six carbon atoms to permit substantially all of the water formed by the said reaction to form an azeotrope, applying heat thereto to initiate a reaction between the said ammonium borate and the said R'OH and distilling the reaction mixture so formed to drive off gaseous ammonia and said azeotrope, hydrolyzing the (R"O)₃B so formed whereby to form boric acid and R"OH and recycling the said R"OH in the said process.

17. The process of claim 16 wherein the azeotrope distilled from the reaction mixture is cooled to room temperature whereby to separate the components thereof and wherein the said R"OH recovered therefrom and the said azetotrope former recovered therefrom are recycled in the said process.

References Cited in the file of this patent

UNITED STATES PATENTS

| | | |
|---|---|---|
| 2,833,623 | May et al. | May 6, 1958 |
| 2,855,427 | May | Oct. 7, 1958 |
| 2,867,502 | Strange et al. | Jan. 6, 1959 |
| 2,880,227 | Wilson | Mar. 31, 1959 |